(12) United States Patent
Atac et al.

(10) Patent No.: US 9,286,684 B2
(45) Date of Patent: Mar. 15, 2016

(54) APPLICATION SYSTEM AND METHOD FOR MEASURING AND COMPENSATING FOR OPTICAL DISTORTION

(71) Applicant: THALES VISIONIX, INC., Clarksburg, MD (US)

(72) Inventors: Robert B. Atac, Batavia, IL (US); Mark W. Edel, Downers Grove, IL (US); Scott A. Spink, Aurora, IL (US); Mark S. Fischler, Warrenville, IL (US); William R. Null, Channahon, IL (US)

(73) Assignee: THALES VISIONIX, INC., Clarksburg, MD (US)

( * ) Notice: Subject to any disclaimer, the term of this patent is extended or adjusted under 35 U.S.C. 154(b) by 78 days.

(21) Appl. No.: 14/207,075

(22) Filed: Mar. 12, 2014

(65) Prior Publication Data

US 2014/0270389 A1    Sep. 18, 2014

Related U.S. Application Data

(60) Provisional application No. 61/794,489, filed on Mar. 15, 2013.

(51) Int. Cl.
| *G06K 9/00* | (2006.01) |
| *G06T 7/00* | (2006.01) |
| *G06T 5/00* | (2006.01) |
| *G06T 7/20* | (2006.01) |
| *H04N 5/228* | (2006.01) |

(52) U.S. Cl.
CPC .............. *G06T 7/0044* (2013.01); *G06T 5/006* (2013.01); *G06T 7/2053* (2013.01); *G06T 2207/30204* (2013.01); *G06T 2207/30244* (2013.01)

(58) Field of Classification Search
CPC ........................................................ G06T 7/00
USPC ........... 382/103, 107, 236; 348/169–172, 352
See application file for complete search history.

(56) References Cited

U.S. PATENT DOCUMENTS

| 6,400,445 B2 * | 6/2002 | Nishi .................. G03F 7/70691 355/53 |
| 7,423,673 B1 * | 9/2008 | Efrat ...................... G02B 27/01 348/222.1 |
| 2007/0081695 A1 * | 4/2007 | Foxlin et al. .................. 382/103 |
| 2010/0086191 A1 | 4/2010 | Freeman et al. |

OTHER PUBLICATIONS

International Search Report and Written Opinion issued Aug. 1, 2014; Application No. PCT/US14/26216.

* cited by examiner

*Primary Examiner* — Abolfazl Tabatabai
(74) *Attorney, Agent, or Firm* — Arent Fox LLP

(57) ABSTRACT

Aspects of the present invention relate to systems, methods, and computer program products for measuring and compensating for optical distortion. The system includes a plurality of reference marks; a recording device configured to record a first orientation and a first position of a plurality of reference marks relative to a pointing angle of the recording device when an object is located outside of a field of view of a recording device, the recording device configured to record a second orientation and a second position of a plurality of reference marks relative to the pointing angle of the recording device when an object is located inside the field of view; and a processor configured to compare the first orientation and the first position of the plurality of reference marks to the second orientation and the second position of the plurality of the reference marks for measuring distortion of the object.

18 Claims, 6 Drawing Sheets

APPLICATION SYSTEM AND METHOD FOR MEASURING AND COMPENSATING FOR OPTICAL DISTORTION

CLAIM OF PRIORITY UNDER 35 U.S.C. §119

This application claims the benefit of and priority to U.S. Provisional Patent Application No. 61/794,489, titled "Application System and Method for Measuring and Compensating for Optical Distortion," filed Mar. 15, 2013, the disclosure of which is hereby incorporated in its entirety by reference herein.

BACKGROUND

Aspects of the present invention generally relate to a system and method for measuring and compensating for optical distortion and, more particularly, to a system and method for measuring and compensating for canopy distortion caused when a pilot views an object through a canopy of an aircraft.

SUMMARY

According to an aspect of the present invention, a method may include recording a first orientation and a first position of a plurality of reference marks relative to a pointing angle of a recording device; disposing an object between the recording device and some of the plurality of reference marks; recording a second orientation and a second position of the plurality of reference marks relative to the pointing angle of the recording device; and comparing the first orientation and the first position of the plurality of reference marks to the second orientation and the second position of the plurality of the reference marks for measuring distortion introduced by the object by calculating the difference between the first orientation and the first position of the plurality of reference marks and the second orientation and the second position of the plurality of reference marks, and using the differences to calculate the distortion introduced by the object.

According to another aspect of the present invention, a system may include a plurality of reference marks; a recording device having a pointing angle, the recording device configured to record a first orientation and a first position of a plurality of reference marks relative to the pointing angle of the recording device when an object is located outside of a field of view of a recording device, the recording device configured to record a second orientation and a second position of a plurality of reference marks relative to the pointing angle of the recording device when an object is located inside the field of view of a recording device; and a processor communicatively coupled to the recording device, the processor configured to receive orientation and position data from the recording device for each of the reference marks and compare the first orientation and the first position of the plurality of reference marks to the second orientation and the second position of the plurality of the reference marks for measuring distortion of the object by calculating the difference between the first orientation and the first position of the plurality of reference marks and the second orientation and the second position of the plurality of reference marks.

According to yet another aspect of the present invention, a system may include means for recording a first orientation and a first position of a plurality of reference marks relative to a pointing angle of a recording device; means for disposing an object between the recording device and some of the plurality of reference marks; means for recording a second orientation and a second position of the plurality of reference marks relative to the pointing angle of the recording device; and means for comparing the first orientation and the first position of the plurality of reference marks to the second orientation and the second position of the plurality of the reference marks for measuring distortion introduced by the object by calculating the difference between the first orientation and the first position of the plurality of reference marks and the second orientation and the second position of the plurality of reference marks, and using the differences to calculate the distortion introduced by the object.

According to yet another aspect of the present invention, a computer program product may include a non-transitory computer-readable medium having control logic stored therein for causing a computer to measure and compensate for optical distortion, the control logic including code for recording a first orientation and a first position of a plurality of reference marks relative to a pointing angle of a recording device; code for disposing an object between the recording device and some of the plurality of reference marks; code for recording a second orientation and a second position of the plurality of reference marks relative to the pointing angle of the recording device; and code for comparing the first orientation and the first position of the plurality of reference marks to the second orientation and the second position of the plurality of the reference marks for measuring distortion introduced by the object by calculating the difference between the first orientation and the first position of the plurality of reference marks and the second orientation and the second position of the plurality of reference marks, and using the differences to calculate the distortion introduced by the object.

It is understood that other aspects of the invention will become readily apparent to those skilled in the art from the following detailed description, wherein various aspects of the present invention are shown and described by way of illustration only. As will be understood, the present invention is capable of other and different variations and its several details are capable of modification in various other respects, all without departing from the scope of the invention. Accordingly, the drawings and detailed description are to be regarded as illustrative in nature and not as restrictive.

BRIEF DESCRIPTION OF THE DRAWINGS

These and other sample aspects of the disclosure will be described in the detailed description and the appended claims that follow, and in the accompanying drawings, wherein:

Figure 1A:
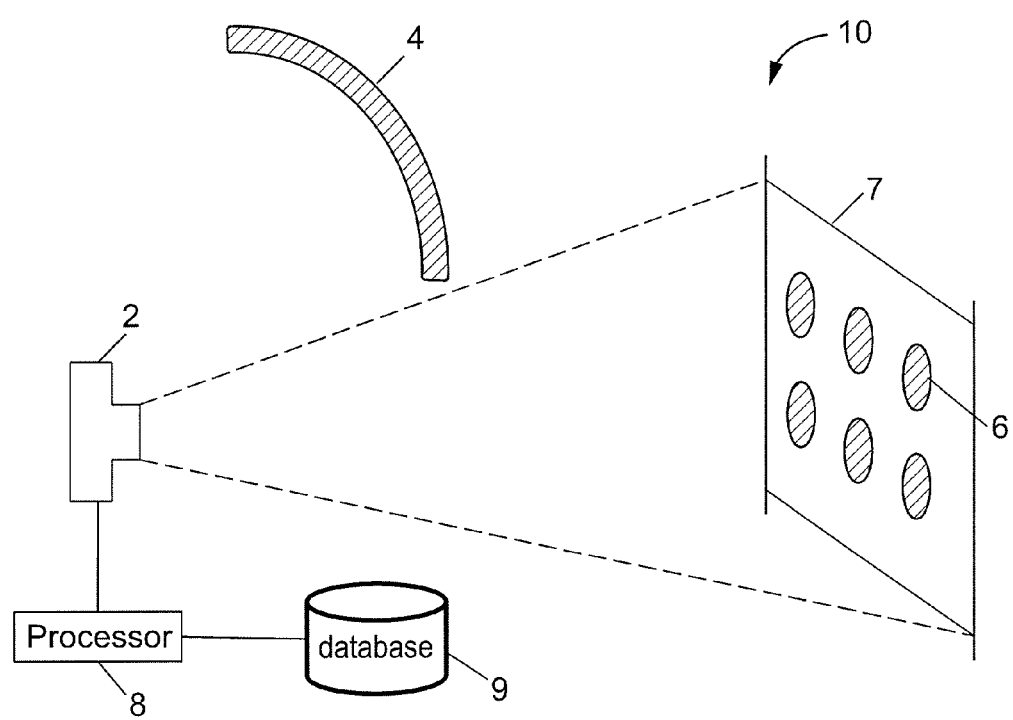
FIG. 1A is a schematic side perspective view of a camera recording the location of a plurality of fiducials with the canopy located out of the field of view of the camera in accordance with an exemplary aspect of the present invention.

In accordance with common practice, the various features illustrated in the drawings may be simplified for clarity. Thus, the drawings may not depict all of the components of a given apparatus or method. In addition, like reference numerals may be used to denote like features throughout the specification and figures.

DETAILED DESCRIPTION

Various aspects of the present invention are described below. It should be apparent that the teachings herein may be embodied in a wide variety of forms and that any specific structure, function, or both being disclosed herein may be merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality, in addition to or other than one or more of the aspects set forth herein. An aspect may comprise one or more elements of a claim.

Referring to the drawings in detail, wherein like reference numerals indicate like elements throughout, there is shown in FIGS. 1-4B, systems and methods for measuring and compensating for optical distortion caused by an object in accordance with an exemplary aspect of the present invention. The words "system" and "method" as used herein are used interchangeably and are not intended to be limiting.

In order to provide the greatest unobstructed field of view for a pilot, transparent canopies are designed to have a curved shape that wrap around the pilot and attach to the hull of the aircraft. An unobstructed view allows a pilot to easily identify surroundings, making maneuvering of the aircraft easier as well. Additionally, greater unobstructed views allow a pilot to also utilize helmet mounted displays including augmented reality having computer-generated images superimposed on actual objects external to the aircraft. However, because of the curved shape of the canopy, it has been suspected that canopy distortion negatively impacts what the pilot is viewing outside the aircraft and may be a significant contributor to errors in the augmented reality display such as pointing error in a helmet targeting system.

In accordance with another aspect of the present invention, a canopy distortion correction algorithm, for example, provides correction for many points within the cockpit of the aircraft, allowing a helmet mounted display system to properly determine the pilot's perceived viewing direction. By properly determining the pilot's perceived viewing direction, a helmet mounted display system can superimpose computer-generated images on its display that correspond to actual objects external to the aircraft. For example, a helmet mounted display may superimpose a targeting circle around another external aircraft viewed by the pilot through the canopy 4. In another example, the pilot can cue a targeting system or a missile that is mounted external to the cockpit by positioning a crosshair displayed on the helmet mounted display onto an external object located on the earth or in the sky and then designating it as the desired object by informing the targeting system or missile the proper direction to sense the object.

Figure 1B:
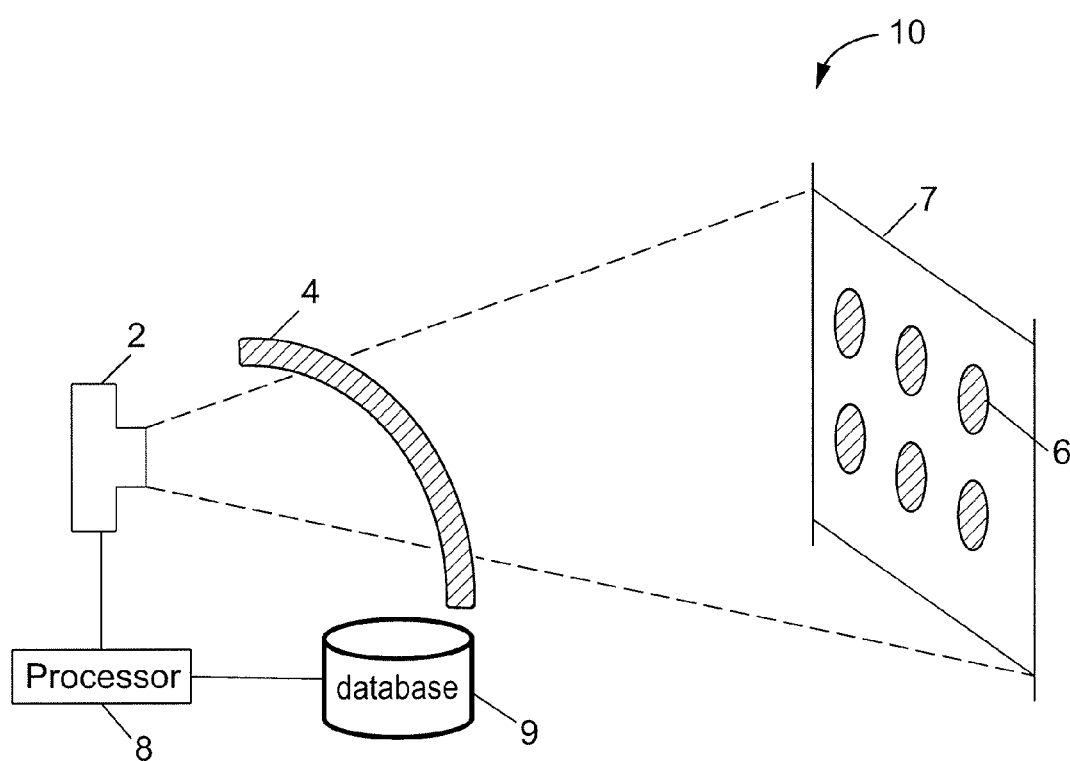
FIG. 1B is a schematic side perspective view of the camera shown in FIG. 1A recording the location of a plurality of fiducials with the canopy located in the field of view of the camera.
Figure 4A:
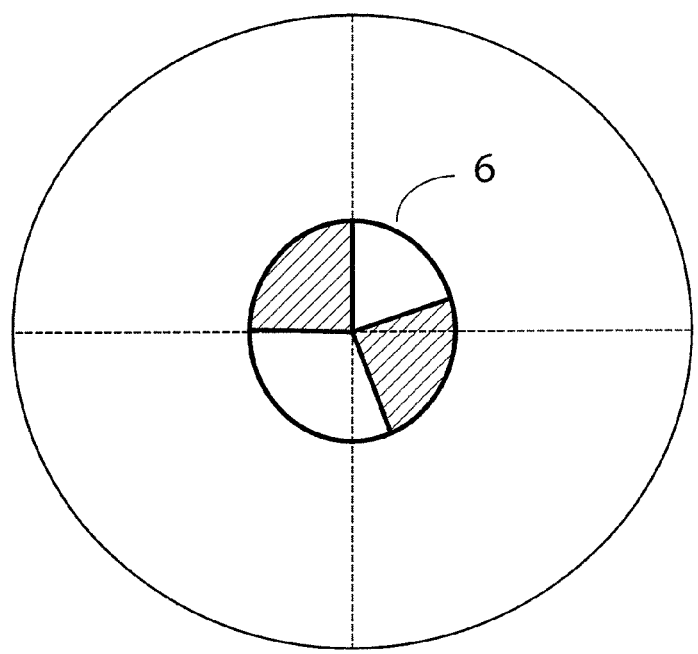
FIG. 4A is a view of a fiducial from the camera shown in FIG. 1A with the canopy located out of the field of view of the camera in accordance with an exemplary aspect of the present invention.
Figure 4B:
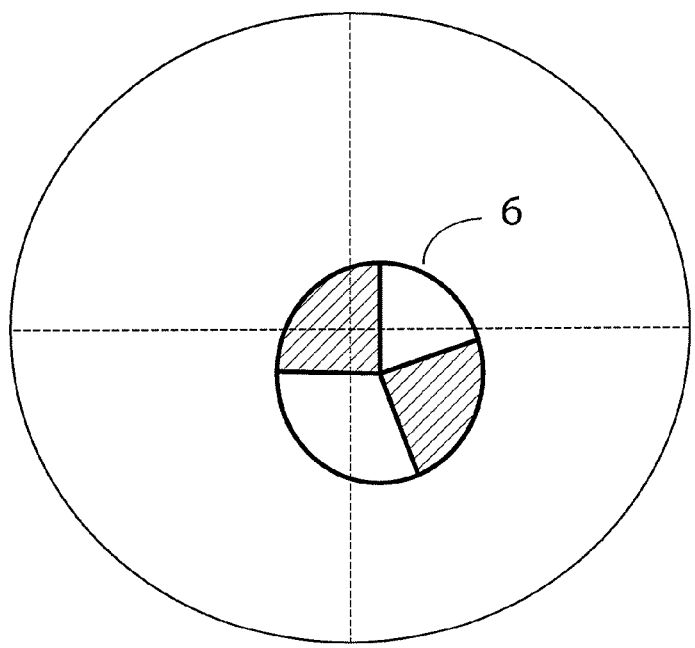
FIG. 4B is a view from the camera shown in FIG. 1B showing the position of a fiducial with the canopy located in the field of view of the camera.

FIGS. 1A and 1B illustrate a system 10 for measuring the optical distortion caused by an object in accordance with another aspect of the present invention. In one aspect, a recording device 2 is used to compare the "perceived" movement of one or more reference marks 6 with and without an object 4 disposed between recording device 2 and reference marks 6. FIG. 4A shows a view of reference mark 6 from recording device 2 with object 4 disposed outside of the field of view of recording device 2. FIG. 4B shows a view of reference mark 6 from recording device 2 with object 4 disposed in the field of view of recording device 2. In one aspect, object 4 is a canopy. In one aspect, a processor 8 calculates the distortion caused by canopy 4. In one aspect, processor 8 uses the calculated distortion to correctly align computer-generated objects and real objects on a pilot's helmet mounted display.

Referring to FIG. 1A, one or more reference marks 6 are placed on a wall 7. In one aspect, reference marks 6 may be placed in an array. In another aspect, reference marks 6 may be placed on wall 7 at random. In one aspect, reference marks are fiducials. U.S. Pat. No. 7,231,063 discloses a fiducial detection system that uses fiducials to track the orientation of a camera viewing the fiducials. The disclosure of U.S. Pat. No. 7,231,063 is herein incorporated by reference in its entirety. In one aspect, each fiducial 6 has a unique pattern that ensures that system 10 correctly compares a single fiducial's 6 measured displacement rather than incorrectly comparing two different fiducials 6. In one aspect, and described in more detail below, fiducial mapping software is used to measure the location and orientation of each fiducial 6.

In one aspect, recording device 2 can be used to record the orientation and position of reference marks 6 when reference marks 6 are in the optical path of recording device 2. In one aspect recording device 2 can be a camera. In one aspect, recording device 2 may be an InterSense® optical/inertial hybrid tracker. In one aspect, recording device 2 is positioned at a predetermined pointing angle. In one aspect, recording device 2 records a first orientation and position of reference marks 6 by imaging each reference mark 6 while canopy 4 is not disposed in the field of view of recording device 2. In one aspect, recording device 2 records a second orientation and position of reference marks 6 by imaging each reference mark 6 while canopy 4 is disposed in the field of view of recording device 2. In one aspect, recording device 2 is mounted on a tracker test gimbal. In one aspect, recording device 2 includes a lens that is used to image the field of view of the lens.

System 10 may further include a processor 8 that receives orientation and position information for reference marks 6 from recording device 2 and performs calculations on the information received from recording device 2. Some of the calculations performed will be described in more detail below. In one aspect, processor 8 may be a computer. In one aspect, processor 8 may be remote from recording device 2. In another aspect, the processor 8 may be included in recording device 2, e.g. InterSense® optical/inertial hybrid tracker. In one aspect, processor 8 stores the received orientation and position information in a storage unit 9.

FIGS. 1A and 1B further illustrate how canopy 4 can be positioned in the optical path of recording device 2 and how canopy 4 can be positioned outside of the optical path of recording device 2 so that recording device 2 can image reference marks 6 in both canopy positions. When canopy 4 is positioned in the optical path of recording device 2, canopy 4 distorts the image of each of the fiducials received by recording device 2 due to the curved shape of canopy 4. The distorted image is compared to a previous image recorded by recording device 2 while canopy 4 is not positioned in the optical path of recording device 2 to measure the amount of distortion caused by canopy 4.

Figure 2:
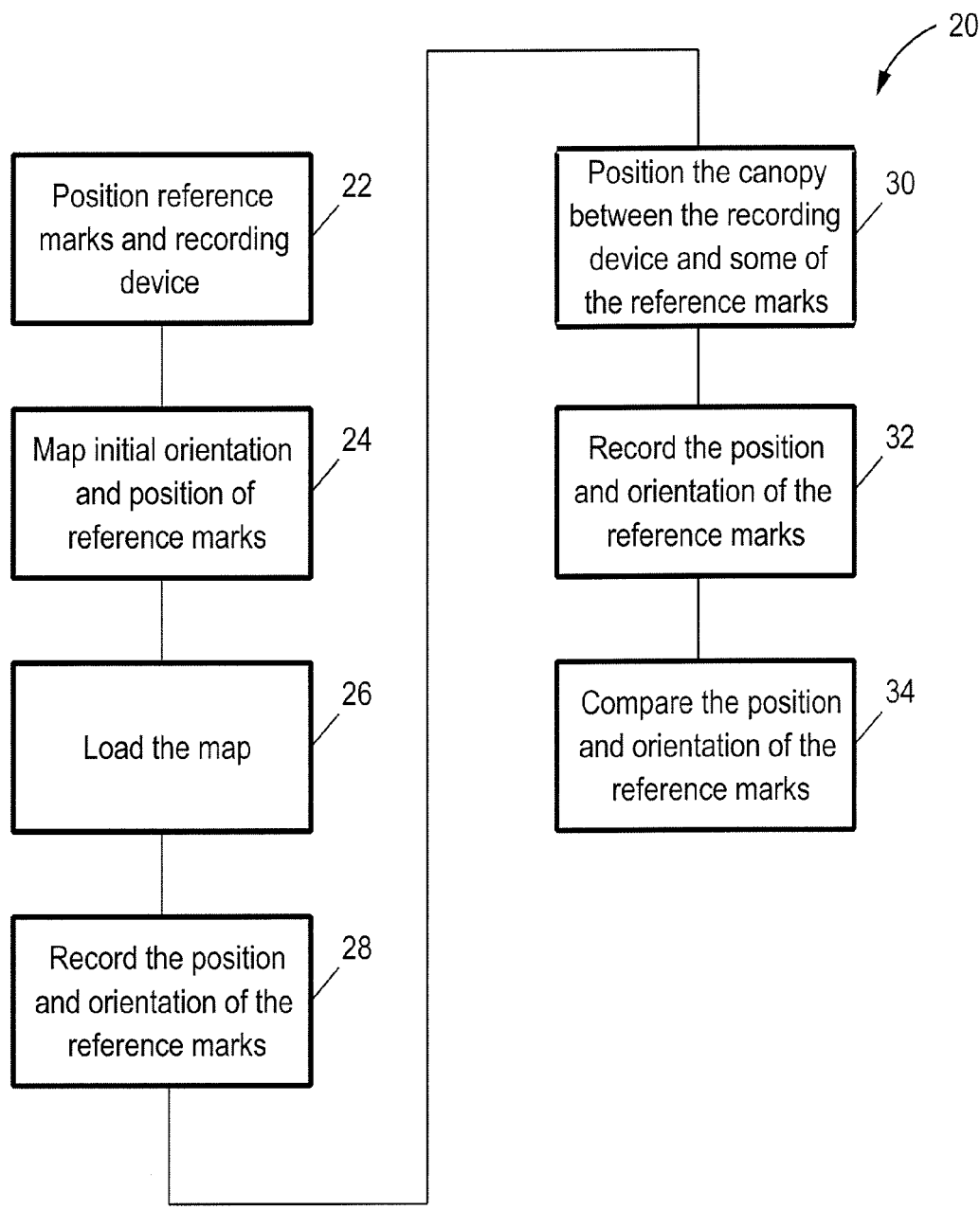
FIG. 2 is a logic flow diagram that describes a method for measuring the distortion of an object in accordance with an exemplary aspect of the present invention.

Referring to FIG. 2, an exemplary aspect of a logic flow diagram that describes a method 20 for measuring the distortion of an object is shown. At step 22, reference marks 6 (shown in FIGS. 1A and 1B) are positioned on a wall 7 (shown in FIGS. 1A and 1B) of a room containing a cockpit. Recording device 2 (shown in FIGS. 1A and 1B) is positioned in the room in an arrangement that places reference marks 6 in the optical path of recording device 2. In one aspect, reference marks 6 are fiducials and fiducial mapping software may be used to measure the location and orientation of each fiducial. The fiducial mapping software uses the orientation of the camera along with successive camera images to record both orientation and images. These recorded images are then compared to determine common features and then with common photogrammetry techniques a three dimensional location of each common feature is determined. In the particular case of using fiducials, the centroid and plane is located for each fiducial as the feature to apply photogrammetry process to. This process will result in a map of fiducial centroid location and fiducial orientations relative to a common origin. In one aspect, reference marks 6 may be installed on two adjoining walls 7 (shown in FIG. 3) to provide alignment to the cockpit. In one aspect, three reference marks 6 may be aligned with the azimuth zero line of the cockpit. In one aspect, three reference 6 marks are arranged vertically. In one aspect, two reference marks 6 may be aligned with the elevation zero line of the cockpit. In one aspect, the reference marks are arranged horizontally. Generally a common reference point is chosen in order to provide some guide to locating fiducials in a array around the object to be measured. The density of fiducials will result in a greater or lesser object distortion map. In other words, the higher the fiducial density the more accurate the object distortion map. It is understood that different numbers of reference marks may be used in different aspects.

At step 24, once reference marks 6 are installed, mapping software may be used to determine the location and orientation of reference marks 6 as described previously. In one aspect, the mapping process determines an X, Y, Z coordinate location of each reference mark 6 as well as an elevation, azimuth and roll orientation of each reference mark 6 to a precision of less than a millimeter. In one aspect, the mapping software uses photogrammetric techniques to create a map of the location and orientation of reference marks 6 as described previously. In one aspect, each reference mark 6 has a unique numerical code, which is used by the mapping software and the recording device to uniquely identify each reference mark 6. Uniquely identifying each reference mark 6 allows processor 8 to properly compare each reference mark's 6 orientation in each image from recording device 2 to determine the amount of distortion caused by canopy 4.

At step 26, the mapping of the coordinate location and orientation of each reference mark 6 is loaded into processor 8 so that the processor has the X, Y, Z location and elevation, azimuth and roll orientation of each reference mark 6 relative to the cockpit and as well as each reference mark's 6 unique identifier. Processor 8 can use the mapping to know which reference marks 6 are valid, and the relative location of each reference mark 6. The mapping allows processor 8 to align reference marks 6 with the cockpit.

At step 28, recording device 2 records a first position and orientation of reference marks 6 located in the optical path of recording device 2. At step 28, canopy 4 is disposed outside of the optical path of recording device 2. Recording device 2 transmits the position and orientation data of each reference mark 6 to processor 8, which stores the position and orientation data in a storage unit 9.

Figure 3:
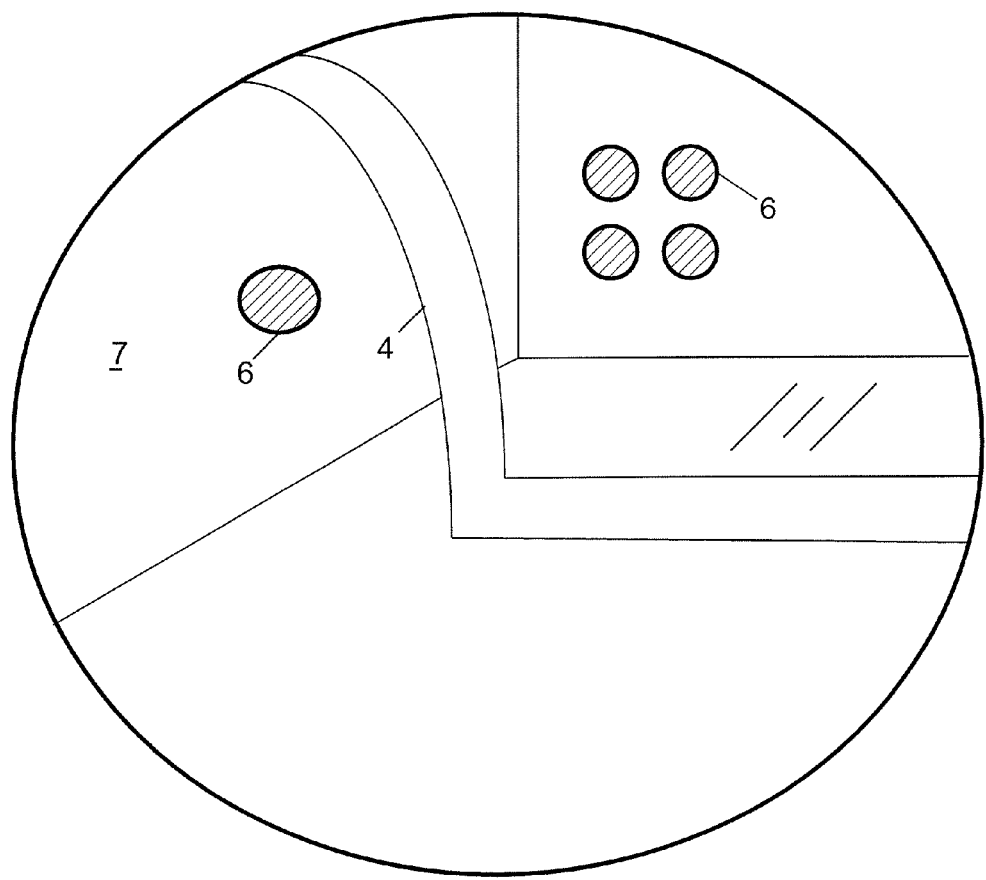
FIG. 3 is a view of the fiducials and canopy from the camera shown in FIG. 1B.

At step 30, canopy 4 is positioned between recording device 2 and at least some of reference marks 6. By positioning canopy 4 accordingly, the optical path of recording device 2 will be distorted, causing reference marks 6 to appear to move relative to their original position. In one aspect, as depicted in FIGS. 1A and 1B, canopy 4 is positioned between recording device 2 and all reference marks 6. In another aspect, as depicted in FIG. 3, canopy 4 is positioned between recording device 2 (not shown) and at least one reference mark 6. By positioning canopy 4 between only some reference marks 6, other reference marks 6 can be used to calibrate recording device 2 in the event that recording device 2 shifts unexpectedly, causing recording device's 2 pointing angle to be shifted as well.

At step 32, recording device 2 records a second position and orientation of each reference mark 6 located in the optical path of recording device 2. Recording device 2 transmits the position and orientation data to the processor 8, which stores the position and orientation data in a storage unit 9. It is understood that step 32 can be repeated multiple times to record multiple position and orientation data points for each reference mark 6.

At step 34, processor 8 retrieves the position and orientation information for each reference mark 6 from storage unit 9 and compares the first position and orientation of each reference mark 6 to the second position and orientation of each reference mark 6 by calculating the difference between the first position and orientation of reference marks 6 and the second position and orientation of reference marks 6. This difference data represents the amount of distortion caused by each portion of the canopy. In one aspect, processor 8 adjusts the difference data based on the type of lens used by recording device 2. By understanding the amount of distortion caused by each portion of the canopy and mapping each of these distortion amounts, a helmet mounted tracking system can adjust its actual targeted position accordingly to properly locate an object external to the aircraft.

In accordance with another aspect of the present invention, the compensation algorithm may utilize a distortion map to correct for error in an aircraft targeting system. In one aspect, the method may include determining the position and orientation of a helmet relative to a canopy using an inertial measurement unit. In one aspect, an inertial measurement unit is mounted to a helmet. In one aspect, an inertial measurement unit tracks the position and orientation of a helmet relative to an aircraft. U.S. Pat. No. 7,000,469 discloses a helmet tracking system that tracks the position and orientation of a helmet relative to an aircraft. The disclosure of U.S. Pat. No. 7,000,469 is herein incorporated in its entirety. In one aspect, an inertial measurement unit is coupled to a processor. In one aspect, an inertial measurement unit outputs a helmet position/orientation signal to a processor.

In accordance with another aspect of the present invention, a processor calculates a targeting direction of a user's helmet orientation based on the helmet position/orientation signal from a helmet mounted inertial measurement unit (IMU) through typical inertial navigation and measurement techniques. The helmet mounted IMU is constantly compared to a similar device mounted to the aircraft. Once the orientation of the aircraft and the orientation of the helmet are determined relative to the earth, symbols can be properly positioned on the helmet mounted display.

In accordance with another aspect of the present invention, the method may include adjusting a targeting direction of a helmet based on a predetermined distortion coefficient stored in a distortion map. For example, when the pilot positions the helmet mounted display (HMD) crosshair onto an external object, the HMD system must determine the orientation of the helmet relative to the earth through the use of a helmet orientation tracker. The HMD system than must apply the canopy distortion coefficient to the measured helmet orientation in order to determine the orientation of the helmet for a sensing system that is not inside the cockpit and subject to canopy distortion. In one aspect, a distortion map associates a helmet targeting direction with a distortion coefficient. In one aspect, after a processor determines a helmet targeting direction of a user, the processor retrieves a corresponding distortion coefficient from a distortion map.

In accordance with another aspect of the present invention, the invention includes one or more computers having one or more processors and memory (e.g., one or more nonvolatile storage devices). In some aspects, memory or computer readable storage medium of memory stores programs, modules and data structures, or a subset thereof for a processor to control and run the various systems and methods disclosed herein. In one aspect, a non-transitory computer readable storage medium having stored there on computer-executable instructions which, when executed by a processor, perform one or more of the methods disclosed herein.

Figure 5:
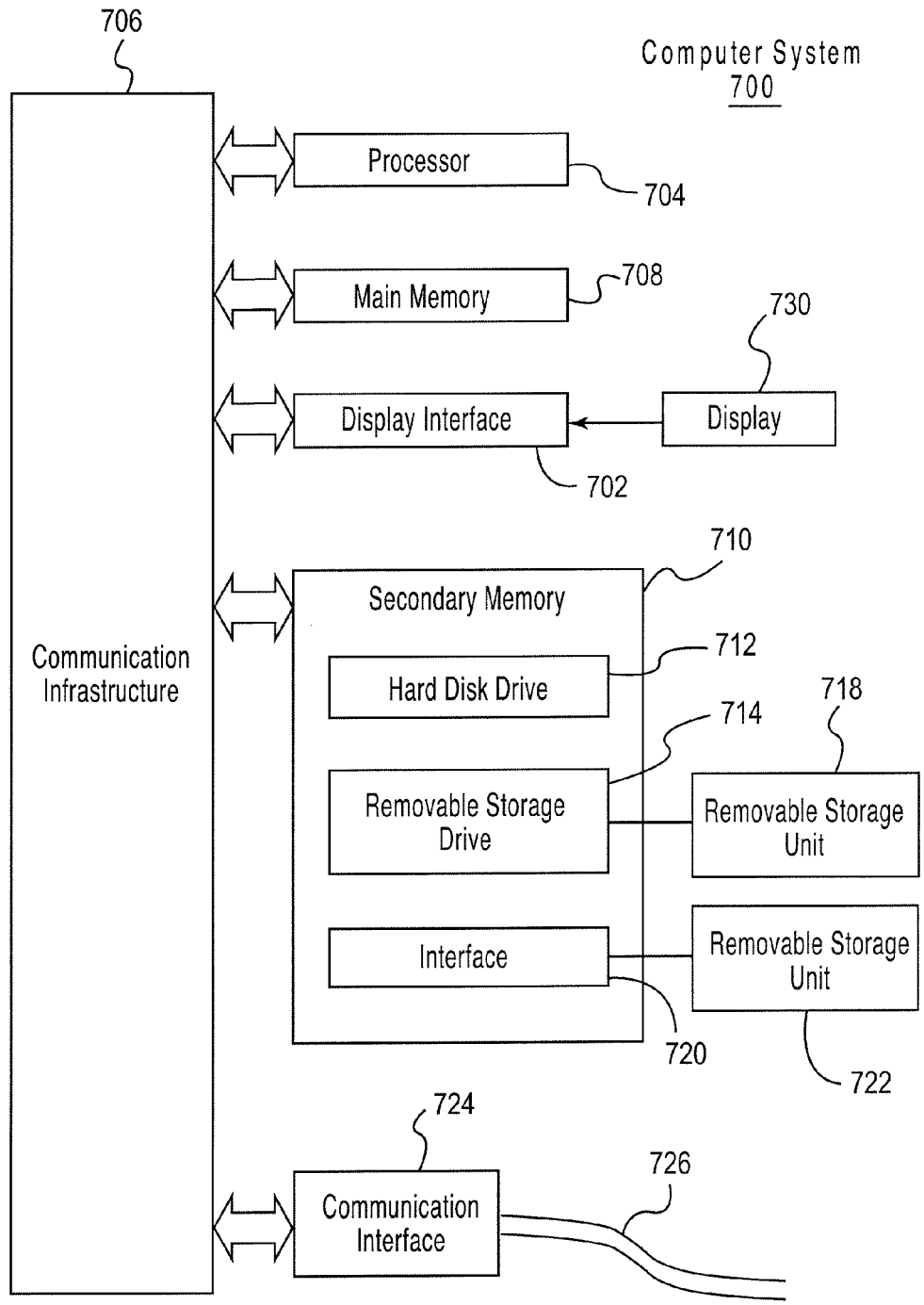
FIG. 5 depicts a computer system for implementing various aspects of the present invention.

Aspects of the present invention may be implemented using hardware, software, or a combination thereof and may be implemented in one or more computer systems or other processing systems. In one variation, aspects of the invention are directed toward one or more computer systems capable of carrying out the functionality described herein. An example of such a computer system 700 is shown in FIG. 5.

Computer system 700 includes one or more processors, such as processor 704. The processor 704 is connected to a communication infrastructure 706 (e.g., a communications bus, a cross-over bar, or a network). Various software aspects are described in terms of this exemplary computer system. After reading this description, it will become apparent to a person skilled in the relevant art(s) how to implement aspects of the invention using other computer systems and/or architectures.

Computer system 700 can include a display interface 702 that forwards graphics, text, and other data from the communication infrastructure 706 (or from a frame buffer not shown) for display on a display unit 730. Computer system 700 also includes a main memory 708, such as random-access memory (RAM), and may also include a secondary memory 710. The secondary memory 710 may include, for example, a hard disk drive 712 and/or a removable storage drive 714, representing a floppy disk drive, a magnetic tape drive, an optical disk drive, etc. The removable storage drive 714 reads from and/or writes to a removable storage unit 718 in a well-known manner. Removable storage unit 718 represents a floppy disk, a magnetic tape, a thumb drive, an optical disk, etc., which is read by and written to removable storage drive 714. As will be appreciated, the removable storage unit 718 includes a computer usable storage medium having stored therein computer software and/or data.

In alternative variations, secondary memory 710 may include other similar devices for allowing computer programs or other instructions to be loaded into computer system 700. Such devices may include, for example, a removable storage unit 722 and an interface 720. Examples of such may include a program cartridge and a cartridge interface (such as that found in video game devices), a removable memory chip (such as an erasable programmable read-only memory (EPROM) or a programmable read-only memory (PROM)) and associated socket, and other removable storage units 722 and interfaces 720, which allow software and data to be transferred from the removable storage unit 722 to computer system 700.

Computer system 700 may also include a communications interface 724. Communications interface 724 allows software and data to be transferred between computer system 700 and external devices. Examples of communications interface 724 may include a modem, a network interface (such as an Ethernet card), a communications port, a Personal Computer Memory Card International Association (PCMCIA) slot and card, etc. Software and data transferred via communications interface 724 are in the form of signals, which may be electronic, electromagnetic, optical, or other signals capable of being received by communications interface 724. These signals are provided to communications interface 724 via a communications path (e.g., channel) 726. This path 726 carries signals and may be implemented using wire or cable, fiber optics, a telephone line, a cellular link, a radio frequency (RF) link, and/or other communications channels. In this document, the teems "computer program medium," "computer-usable medium," and "computer-readable medium" are used to refer generally to media such as a removable storage drive 714, a hard disk installed in hard disk drive 712, and signals. These computer program products provide software to the computer system 700. Aspects of the invention are directed to such computer program products.

Computer programs (also referred to as computer control logics) are stored in main memory 708 and/or secondary memory 710. Computer programs may also be received via communications interface 724. Such computer programs, when executed, enable the computer system 700 to perform the features in accordance with aspects of the present invention, as discussed herein. In particular, the computer programs, when executed, enable the processor 704 to perform such features. Accordingly, such computer programs represent controllers of the computer system 700.

In a variation where aspects of the invention are implemented using software, the software may be stored in a computer program product and loaded into computer system 700 using removable storage drive 714, hard disk drive 712, or communications interface 720. The control logic (software), when executed by the processor 704, causes the processor 704 to perform the functions as described herein. In another variation, aspects of the invention are implemented primarily in hardware using, for example, hardware components, such as application-specific integrated circuits (ASIC's). Implementation of the hardware state machine so as to perform the functions described herein will be apparent to persons skilled in the relevant art(s).

In yet another variation, aspects of the invention are implemented using a combination of both hardware and software.

While aspects of the present invention have been described in connection with preferred implementations, it will be understood by those skilled in the art that variations and modifications described above may be made without departing from the scope hereof. Other aspects will be apparent to those skilled in the art from a consideration of the specification or from a practice of the aspects of the invention disclosed herein.

It will be appreciated by those skilled in the art that changes could be made to the exemplary aspects shown and described above without departing from the broad inventive concept thereof. It is understood, therefore, that this invention is not limited to the exemplary aspects shown and described, but it is intended to cover modifications within the spirit and scope of the present invention as defined by the claims. For example, specific features of the exemplary aspects may or may not be part of the claimed invention and features of the disclosed aspects may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

What is claimed is:

1. A method comprising:
    recording a first orientation and a first position of a plurality of reference marks relative to a pointing angle of a recording device;
    disposing an object between the recording device and some of the plurality of reference marks;
    recording a second orientation and a second position of the plurality of reference marks relative to the pointing angle of the recording device; and
    comparing, by a processor, the first orientation and the first position of the plurality of reference marks to the second orientation and the second position of the plurality of the reference marks for measuring distortion introduced by the object by calculating the difference between the first orientation and the first position of the plurality of reference marks and the second orientation and the second position of the plurality of reference marks, and using the differences to calculate the distortion introduced by the object.

2. The method according to claim 1, further comprising:
    before recording the first orientation and the first position of the plurality of reference marks:
        mapping an initial orientation and an initial position of each of the plurality of reference marks relative to a reference point; and
        loading the initial orientation and the initial position of each of the plurality of reference marks into the recording device.

3. The method according to claim 2, wherein the initial orientation includes an X, Y, Z location and elevation, azimuth and roll orientation of each reference mark relative to the origin of a reference coordinate frame.

4. The method according to claim 2, further comprising:
    imaging each of the plurality of reference marks at the first and second orientations and positions using the recording device.

5. The method according to claim 4, wherein the recording device is a camera or other optical sensor that can sense the positions of the marks.

6. The method according to claim 4, wherein the recording device is an optical/inertial hybrid tracker.

7. The method according to claim 1, wherein the object is disposed between some of the plurality of reference marks but not others of the plurality of reference marks.

8. The method according to claim 7, wherein the difference between the first and second orientations of the others of the plurality of reference marks is subtracted from the difference between the first and second orientations of the some of the plurality of reference marks.

9. The method according to claim 1, wherein each of the plurality of reference marks is a fiducial.

10. The method according to claim 1, wherein each of the plurality of reference marks is an emitting device such as an LED.

11. The method according to claim 1, wherein the recording device has a first pointing angle for recording the first orientation of the plurality of reference marks and a second pointing angle for recording the second orientation of the plurality of reference marks, the first pointing angle being different from the second pointing angle.

12. The method according to claim 1, wherein three reference marks are aligned with an azimuth zero line of the object and two reference marks are aligned with an elevation zero line of the object.

13. The method according to claim 1, wherein the recording device includes a lens.

14. The method according to claim 1, wherein the object is not disposed between any reference marks in the optical field of view of the recording device and the recording device.

15. The method according to claim 1, wherein the object is a canopy of an aircraft.

16. A system comprising:
    a plurality of reference marks;
    a recording device having a pointing angle, the recording device configured to record a first orientation and a first position of a plurality of reference marks relative to the pointing angle of the recording device when an object is located outside of a field of view of a recording device, the recording device configured to record a second orientation and a second position of a plurality of reference marks relative to the pointing angle of the recording device when an object is located inside the field of view of a recording device; and
    a processor communicatively coupled to the recording device, the processor configured to receive orientation and position data from the recording device for each of the reference marks and compare the first orientation and the first position of the plurality of reference marks to the second orientation and the second position of the plurality of the reference marks for measuring distortion of the object by calculating the difference between the first orientation and the first position of the plurality of reference marks and the second orientation and the second position of the plurality of reference marks.

17. A system comprising:
    means for recording a first orientation and a first position of a plurality of reference marks relative to a pointing angle of a recording device;
    means for disposing an object between the recording device and some of the plurality of reference marks;
    means for recording a second orientation and a second position of the plurality of reference marks relative to the pointing angle of the recording device; and
    means for comparing the first orientation and the first position of the plurality of reference marks to the second orientation and the second position of the plurality of reference marks for measuring distortion introduced by the object by calculating the difference between the first orientation and the first position of the plurality of reference marks and the second orientation and the second position of the plurality of reference marks, and using the differences to calculate the distortion introduced by the object.

18. A computer program product comprising a non-transitory computer-readable medium having control logic stored therein for causing a computer to measure and compensate for optical distortion, the control logic comprising:
　code for recording a first orientation and a first position of a plurality of reference marks relative to a pointing angle of a recording device;
　code for disposing an object between the recording device and some of the plurality of reference marks;
　code for recording a second orientation and a second position of the plurality of reference marks relative to the pointing angle of the recording device; and
　code for comparing the first orientation and the first position of the plurality of reference marks to the second orientation and the second position of the plurality of the reference marks for measuring distortion introduced by the object by calculating the difference between the first orientation and the first position of the plurality of reference marks and the second orientation and the second position of the plurality of reference marks, and using the differences to calculate the distortion introduced by the object.

* * * * *